United States Patent
Christiansen et al.

(10) Patent No.: US 8,951,034 B2
(45) Date of Patent: Feb. 10, 2015

(54) MODULAR MOULD SYSTEM FOR MANUFACTURING A SHELL PART

(75) Inventors: Per Kjaer Christiansen, Gesten (DK); Finn Johansen, Middelfart (DK)

(73) Assignee: LM Glasfiber A/S, Kolding (DK)

( * ) Notice: Subject to any disclaimer, the term of this patent is extended or adjusted under 35 U.S.C. 154(b) by 0 days.

(21) Appl. No.: 13/503,141

(22) PCT Filed: Oct. 18, 2010

(86) PCT No.: PCT/EP2010/065613
§ 371 (c)(1),
(2), (4) Date: Apr. 20, 2012

(87) PCT Pub. No.: WO2011/051130
PCT Pub. Date: May 5, 2011

(65) Prior Publication Data
US 2012/0211637 A1  Aug. 23, 2012

(30) Foreign Application Priority Data

Oct. 27, 2009  (EP) .................................. 09174117

(51) Int. Cl.
*B29C 33/30* (2006.01)
*B64C 27/46* (2006.01)
(Continued)

(52) U.S. Cl.
CPC ............ *B29C 33/306* (2013.01); *B29C 33/3842* (2013.01); *B29C 33/305* (2013.01); *B29C 33/005* (2013.01); *B29C 33/302* (2013.01); *B29L 2031/082* (2013.01)
USPC ........ 425/438; 425/440; 425/441; 425/451.9; 425/471; 249/127; 249/134; 249/139; 249/154; 249/163; 249/169

(58) Field of Classification Search
CPC .. B29C 33/005; B29C 33/302; B29C 33/305; B29C 33/3842; B29L 2031/082; B29L 2031/085; B64C 27/46
USPC ......... 249/102, 127, 134, 139, 160, 163, 168, 249/169; 425/447, 451.9, 470–471, 440, 425/438, 441; 156/182, 245; 264/241–242, 264/299, 313, 642
See application file for complete search history.

(56) References Cited

U.S. PATENT DOCUMENTS 2,760,898 A * 8/1956 Voelker ......................... 156/252
3,171,163 A * 3/1965 Ford et al. ..................... 425/390
(Continued)

FOREIGN PATENT DOCUMENTS

DE  19833869 C1 * 3/2000 ............. B64C 27/46
EP  1316400 A1  6/2003
(Continued)

OTHER PUBLICATIONS

Translation copy of DE 19833869.*

*Primary Examiner* — Dimple Bodawala
(74) *Attorney, Agent, or Firm* — Nath, Goldberg & Meyer; Jerald L. Meyer; Sanjana Mangalagiri

(57) ABSTRACT

A modular mold system for manufacturing a shell part of an oblong composite structure having a longitudinal direction from a fiber reinforced matrix material. The modular mould system includes a number of mold sections, which are adapted to being assembled to an assembled mold part. The number of mold sections includes a first mold section having a first molding surface with a contour that defines a surface of a first longitudinal part of the shell part and a first end section; and a second mold section having a second molding surface with a contour that defines a surface of a second longitudinal part of the shell part and a second end section; which, when the modular mold system is assembled to the assembled mold, the second end section of the second mold section abuts the first end section of the first mold section.

14 Claims, 12 Drawing Sheets

(51) Int. Cl.
  *B29C 33/38* (2006.01)
  *B29C 33/00* (2006.01)
  *B29L 31/08* (2006.01)

(56) References Cited

U.S. PATENT DOCUMENTS

| | | | | |
|---|---|---|---|---|
| 4,507,011 | A * | 3/1985 | Brown | 403/404 |
| 6,264,877 | B1 * | 7/2001 | Pallu De La Barriere | 264/516 |
| 7,223,091 | B2 * | 5/2007 | Olsen et al. | 425/450.1 |
| 7,909,290 | B2 * | 3/2011 | Cooper | 244/132 |
| 8,016,237 | B2 * | 9/2011 | Berry et al. | 244/131 |
| 8,292,255 | B2 * | 10/2012 | Gallana Blanco et al. | 249/114.1 |
| 2006/0251496 | A1 * | 11/2006 | Wood et al. | 411/507 |
| 2010/0304170 | A1 * | 12/2010 | Frederiksen | 428/542.8 |
| 2011/0100542 | A1 * | 5/2011 | Faulkner et al. | 156/245 |
| 2012/0093964 | A1 * | 4/2012 | Mironov | 425/450.1 |
| 2012/0107129 | A1 * | 5/2012 | Kulenkampff et al. | 416/226 |

FOREIGN PATENT DOCUMENTS

| | | | | |
|---|---|---|---|---|
| EP | 1780120 | A2 | 5/2007 | |
| EP | 2033769 | A1 * | 3/2009 | B29C 70/44 |
| FR | 2612447 | A1 | 9/1988 | |
| WO | WO 2006002621 | A1 * | 1/2006 | F03D 1/06 |

* cited by examiner

MODULAR MOULD SYSTEM FOR MANUFACTURING A SHELL PART

This is a National Phase Application filed under 35 U.S.C. 371 as a national stage of PCT/EP2010/065613, filed 18 Oct. 2010, claiming the benefit from European Application No. 09174117.3, filed 27 Oct. 2009, the content of which is hereby incorporated by reference in its entirety.

TECHNICAL FIELD

The present invention relates to a modular mould system for manufacturing a shell part of an oblong composite structure, the structure comprising a fibre reinforced matrix material and having a longitudinal direction, the mould system including a number of mould sections, which are adapted to being assembled to an assembled mould part, the number of mould sections comprising at least: a first mould section for moulding a first longitudinal part of the shell part and having a first moulding surface with a contour that defines a surface of the first longitudinal part of the shell part, the first mould section comprising an end section, and a second mould section for moulding a second longitudinal part of the shell part and having a second moulding surface with a contour that defines a surface of the second longitudinal part of the shell part, the second mould section comprising an end section, which, when the modular mould system is assembled to the assembled mould, abuts the end section of the first mould section.

BACKGROUND

Manufacturing of large oblong composite structures is by nature space consuming. Furthermore, this problem is enhanced as even a minor change in the structure, e.g. only relating to one end of the structure, commonly requires a complete, separate mould.

Wind turbine blades of fibre-reinforced polymer are usually manufactured as shell parts in moulds, where the top side and the bottom side of the blade profile (typically the pressure side and suction side, respectively) are manufactured separately by arranging glass fibre mats in each of the two mould parts. Afterwards, the two halves are glued together, often by means of internal flange parts. Glue is applied to the inner face of the lower blade half before the upper blade half is lowered thereon. Additionally, one or two reinforcing profiles (beams) are often attached to the inside of the lower blade half prior to gluing to the upper blade half.

The shell parts for the wind turbine blade are typically manufactured as fibre composite structures by means of VARTM (vacuum assisted resin transfer moulding), where liquid polymer, also called resin, is filled into a mould cavity, in which fibre material has been priorly inserted, and where a vacuum is generated in the mould cavity, hereby drawing in the polymer. The polymer can be thermoset plastic or thermoplastics.

Vacuum infusion or VARTM is a process used for moulding fibre composite mouldings, where uniformly distributed fibres are layered in one of the mould parts, the fibres being rovings, i.e. bundles of fibre bands, bands of rovings, or mats, which are either felt mats made of individual fibres or woven mats made of fibre rovings. The second mould part is often made of a resilient vacuum bag, and is subsequently placed on top of the fibre material. By generating a vacuum, typically 80% to 95% of the total vacuum, in the mould cavity between the inner side of the mould part and the vacuum bag, the liquid polymer can be drawn in and fill the mould cavity with the fibre material contained herein. So-called distribution layers or distribution tubes, also called inlet channels, are used between the vacuum bag and the fibre material in order to obtain as sound and efficient a distribution of polymer as possible. In most cases, the polymer applied is polyester or epoxy, and most often the fibre reinforcement is based on glass fibres or carbon fibres.

From DE 19833869 C1 it is known to provide a mould for wind turbine blades in a number of sections. However, the document is silent about how to ensure a smooth transition between the mould sections. Likewise, it is not discussed how to ensure that alternative mould sections, e.g. corresponding to different blade tips, are made to fit a given mid section.

Therefore, it is an object of the invention to obtain a new modular mould system, which overcomes or ameliorates at least one of the disadvantages of the prior art or which provides a useful alternative.

DISCLOSURE OF THE INVENTION

The object of the invention is obtained by a modular mould system for manufacturing a shell part of an oblong composite structure, the structure comprising a fibre reinforced matrix material and having a longitudinal direction, the mould system including a number of mould sections, which are adapted to being assembled to an assembled mould part, the number of mould sections comprising at least:
a first mould section for moulding a first longitudinal part of the shell part and having a first moulding surface with a contour that defines a surface of the first longitudinal part of the shell part, the first mould section comprising an end section, and
a second mould section for moulding a second longitudinal part of the shell part and having a second moulding surface with a contour that defines a surface of the second longitudinal part of the shell part, the second mould section comprising an end section, which, when the modular mould system is assembled to the assembled mould, abuts the end section of the first mould section, wherein
the first moulding surface comprises an end segment at the end section of the first mould section, the end segment of the first moulding surface being at least partially flexible. Thereby, a particularly flexible and space-efficient mould system may be achieved, wherein the contour of the end segment of the first moulding surface can be varied at mould assembly, so that it fits exactly to the second moulding surface at the end section of the second mould section. Thus, the first mould section and second mould section can be manufactured separately without being too concerned about manufacturing tolerances, since the contour of the end segment can be varied to compensate for the manufacturing tolerances. Obviously, the entire end segment may be flexible. Furthermore, it is evident to a person skilled in the art that the second moulding surface may also comprise an end segment, which is at least partially flexible.

According to an aspect of the invention, the modular mould system further comprises at least a first and a second transverse mould section, which are adapted to being assembled to an assembled mould or an assembled longitudinal mould section, wherein
the first transverse mould section for moulding a first transverse part of the shell part has a first moulding surface with a contour that defines an outer surface of the first transverse part of the shell part, the first transverse mould section comprising a side section, and the second transverse mould section for moulding a second transverse part of the shell part and has a second moulding surface with a contour that defines an outer surface of the second transverse part of the shell part, the second transverse mould section comprising a side section, which, when the modular mould system is assembled to the assembled mould, abuts the side section of the first transverse mould section, wherein the first transverse moulding surface comprises a side segment at the side section of the first mould section, the side segment of the first moulding surface being at least partially flexible.

According to the above-mentioned aspect of the invention, wherein the first and second transverse mould sections are adapted for being assembled to a longitudinal mould section, the mould system further comprises at least an additional longitudinal mould section, wherein the additional longitudinal mould section for moulding an additional longitudinal part of the shell part has an additional moulding surface with a contour that defines a surface of the additional longitudinal part of the shell part, the additional longitudinal mould section comprising an end section, and the first and/or the second transverse mould section comprises an end section, which, when the modular mould system is assembled to an assembled mould, abuts the end section of the additional longitudinal mould section, and wherein the first and/or second moulding surface comprises an end segment at the end section of the assembled longitudinal mould section, the end segment of the first and/or second moulding surface being at least partially flexible.

In an embodiment of the invention, the oblong composite structure is a wind turbine blade having a root region and a tip region. Preferably, the wind turbine blade is assembled from at least a first and a second shell part. Thus, the mould assembly may be used to mould one of these shell parts.

According to an advantageous embodiment, the wind turbine blade is adapted for a rotor of a wind turbine having a substantially horizontal rotor shaft, the rotor comprising a hub, from which the blade extends substantially in a radial direction when mounted to the hub, the blade comprising a profiled contour, wherein the profiled contour in the radial and a longitudinal direction is divided into:

the root region with a substantially circular or elliptical profile closest to the hub, the substantially circular or elliptical profile having a diameter, the airfoil region with a lift generating profile furthest away from the hub, and a transition region between the root region and the airfoil region, the profile of the transition region gradually changing in the radial direction from the circular or elliptical profile of the root region to the lift generating profile of the airfoil region, the airfoil region comprising a tip region being furthest away from the hub. Such wind turbine blades are known to be so long that space constraints during construction increase production cost. Thus, a modular system which may minimise the number of required moulds and which may serve to reuse identical parts of different blade varieties is desirable.

According to a specific embodiment, the airfoil region of the wind turbine blade comprises a suction side and a pressure side. The blade may be assembled from a shell part substantially comprising the suction side and a shell part substantially comprising the pressure side.

In another embodiment of the invention, an end facet of the first moulding surface fits substantially to an end facet of the second moulding surface. Thus, the flexible end part is only used to compensate for the small manufacturing tolerances.

In a specific embodiment of the invention, the end facet of the first moulding surface fits substantially to an end facet of the second moulding surface within a tolerance of ±0-100 mm, or ±0-50 mm, or even ±0-30 mm. Alternatively, the end facet of the first moulding surface fits substantially to an end facet of the second moulding surface within a tolerance of 0-20%, or 0-10%, or even 0-5% of the length in the longitudinal direction of the end segment.

In another embodiment of the invention, the end segment of the first moulding surface is made as a flexible plate element. Hereby, a smooth surface may be achieved in vicinity of the end sections of the mould sections.

In another embodiment of the invention, the flexible plate element comprises a fibre reinforced matrix material. This means that the plate element is made as a composite structure, e.g. made of a glass fibre material impregnated with a cured resin. In this way, an end segment is achieved, which may be both flexible and mechanically strong.

In another embodiment of the invention, the first mould section comprises a cavity containing a fluid, preferably a substantially non-compressible fluid, for supporting the flexible plate element. Thereby, a simple method is provided for varying the flexible end segment and subsequently making the end segment rigid before manufacturing the composite structure.

In a specific embodiment, the fluid is water. Thus, a flexible, inexpensive, and environmentally safe system may be achieved.

In another embodiment of the invention, the second moulding surface comprises an end segment at the end part of the second mould section, the end segment of the second moulding surface being at least partially flexible. Hereby, an extra degree of flexibility is provided, thus making it very easy to make the moulding surfaces of the two mould sections fit exactly to each other.

In another embodiment of the invention, the end segments of the first moulding surface and the second moulding surface abut each other. Hereby, a smooth transition may be achieved between the two moulding surfaces. Thus, a quality parameter, such as smoothness, of the finished surface of the shell part may be improved.

In another embodiment of the invention, the end segment of the first moulding surface overlaps the end section of the second moulding surface or overlaps the end segment of the second moulding surface when the modular mould system is assembled to the assembled mould. Hereby, a modular mould system may be achieved, in which an angle between the two moulding surfaces may be varied. Thus, the manufacturing tolerances of the mould sections may be relaxed even further.

In another embodiment of the invention, the first mould section and/or the second mould section comprises an additional end part, wherein the first moulding surface and/or the second moulding surface comprises an additional end segment at said additional end part, the additional end segment of the first moulding surface and/or the second moulding surface being at least partially flexible. Thus, both end segments of a mould section may be flexible. Thus, it is also clear that the modular mould system may comprise three, four, five or even more individual mould sections.

In another embodiment of the invention, the end segment of the first moulding surface is transformable between a first contour and a second contour. Thus, the mould system can be made versatile, since the same mould section may be fitted to separate mould sections having slightly different contour at an end section or end segment.

In another embodiment of the invention, at least the end segment of the first mould section extends in at least 5% of the longitudinal direction of the first mould section's length. Hereby, a sufficiently long part of the mould section is made flexible to provide a required tolerance between mould sections. Alternatively, the end segment of the first mould section extends in a range of 3-15% or 5-10% of the longitudinal direction of the first mould section's length. Evidently, any other end segments comprised by the mould system may extend a similar distance along that particular mould section's length, or alternatively, may extend a similar absolute distance as the first end segment.

In another embodiment of the invention, the mould system comprises a plurality of separate mould sections for moulding root regions with different contours. Hereby, an efficient mould system is achieved, which may be adapted for producing wind turbine blades for a number of different variations of hub connections but having substantially equal airfoil regions. Thus, the need for having a full mould for each variant of hub connections may be alleviated. Typically, different manufacturers of wind turbines have their own hub connection schemes, which are is generally mutually incompatible.

In another embodiment of the invention, the mould system comprises a plurality of separate mould sections for moulding tip regions with different contours. According to a specific embodiment, the mould system comprises a plurality of separate mould sections for moulding transition regions with different contours.

According to another specific embodiment, the mould system comprises a plurality of separate mould sections for moulding airfoil regions with different contours.

According to another specific embodiment, the separate mould sections of the mould system are combinable in a plurality of ways, so that when the mould system is in different configurations, shell parts with varying dimensions and/or contours are manufactured.

BRIEF DESCRIPTION OF THE DRAWINGS

The invention is explained in detail below with reference to an embodiment shown in the drawings, in which.

DETAILED DESCRIPTION OF THE INVENTION

Figure 1:
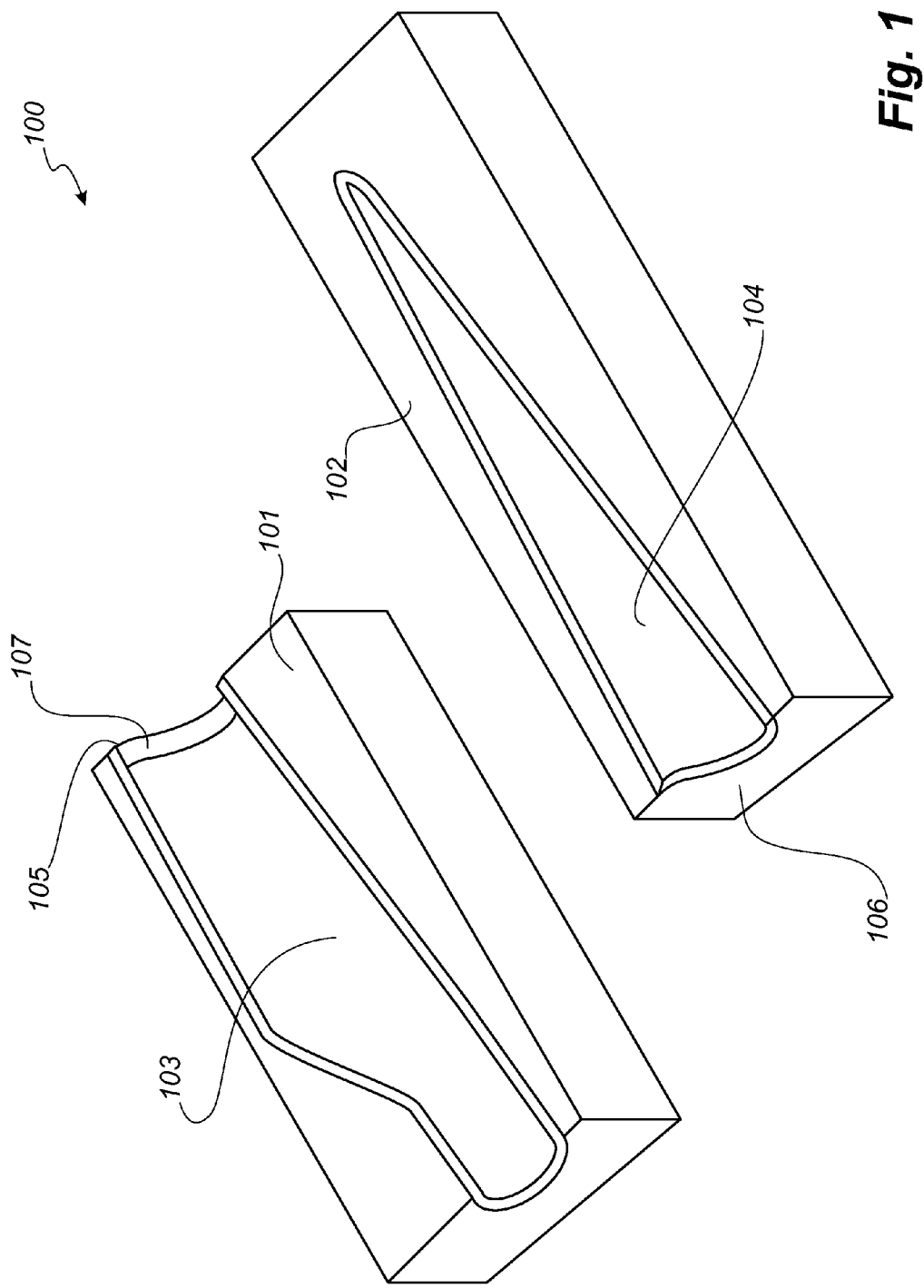
FIG. 1 shows an embodiment of a modular mould system according to the invention.

FIG. 1 illustrates a modular mould part 100 according to the inventive system. Here, the mould part 100 is shown to comprise two mould sections, namely the first 101 and the second 102 mould section. When assembled, the two mould sections 101, 102 form an assembled mould part. Assembly of the two mould sections 101, 102 is accommodated by the end section 105 of the first mould section 101 and the end section 106 of the second mould section 102. At least the end section 105 of the first mould section 101 comprises an end segment 107, which is at least flexible in parts. The end section 106 of the second mould section 102 may also comprise a partly flexible end segment (not shown).

Figure 2:
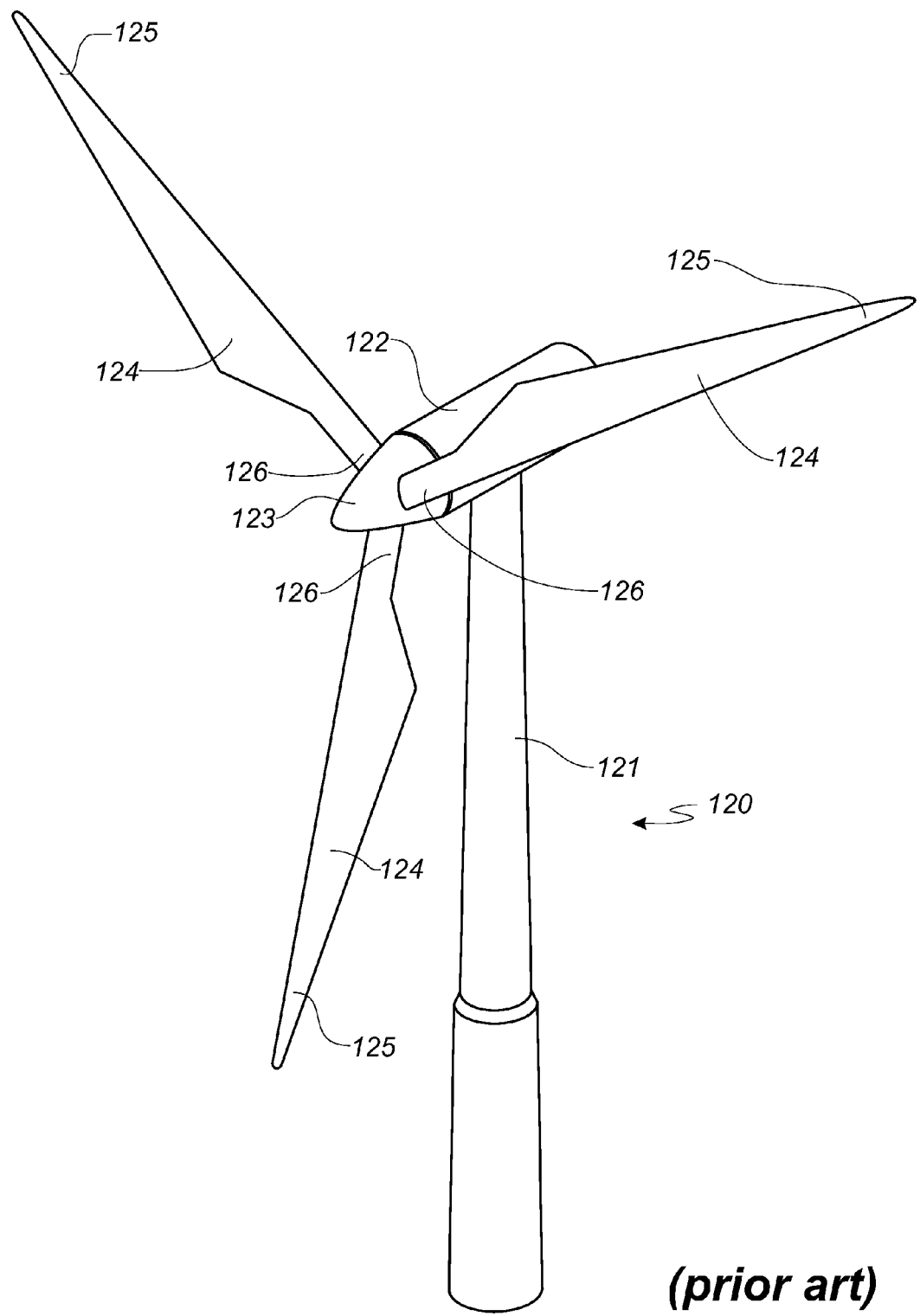
FIG. 2 shows a prior art wind turbine.

FIG. 2 illustrates a conventional modern upwind wind turbine 120 according to the so-called "Danish concept" with a tower 121, a nacelle 122 and a rotor with a substantially horizontal rotor shaft. The rotor includes a hub 123 and three blades 124 extending radially from the hub 123, each blade 124 having a blade root 126 nearest the hub 123 and a blade tip 125 furthest from the hub 123.

Figure 3:
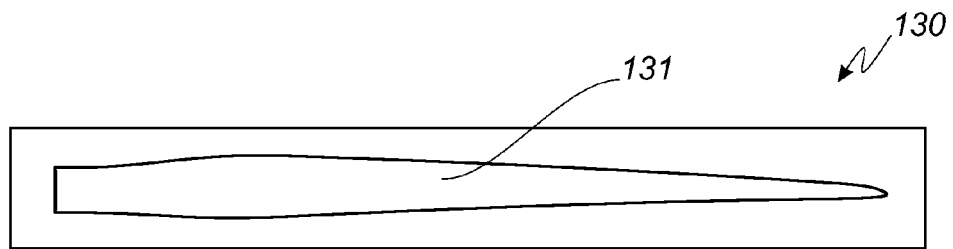
FIG. 3 shows a prior art mould for a wind turbine blade.

FIG. 3 illustrates a prior art mould part 130 for a shell part of a wind turbine blade 124 of the type shown in FIG. 2. The mould part 130 has a single moulding surface 131 with a shape or contour defining the surface of the shell part manufactured in the mould part 130. Typically, the moulding surface 131 is adapted to define the outer surface of the blade, i.e. the surface over which the wind flows, to ensure formation of a smooth and aerodynamic outer surface. However, the moulding surface 131 may also be adapted to define the inner surface of the blade, or in other words the mould part being a positive mould. Commonly, the mould part 130 is constructed as a composite moulding surface mounted on a load bearing support structure, such as a metal frame. The mould part 130 must be at least the length of the blade. For blades of modern wind turbines, this can mean moulds of considerable length, e.g. over 50 or 60 m. Typically, manufacturers of wind turbines use their own layout of the connection between the blade and the hub of the wind turbine. Nevertheless, substantial parts of blades for various brands of wind turbines may be identical or only have minor variations. Still, however, a manufacturer of wind turbine blades currently needs to have complete moulds for all variations of blades.

Figure 4:
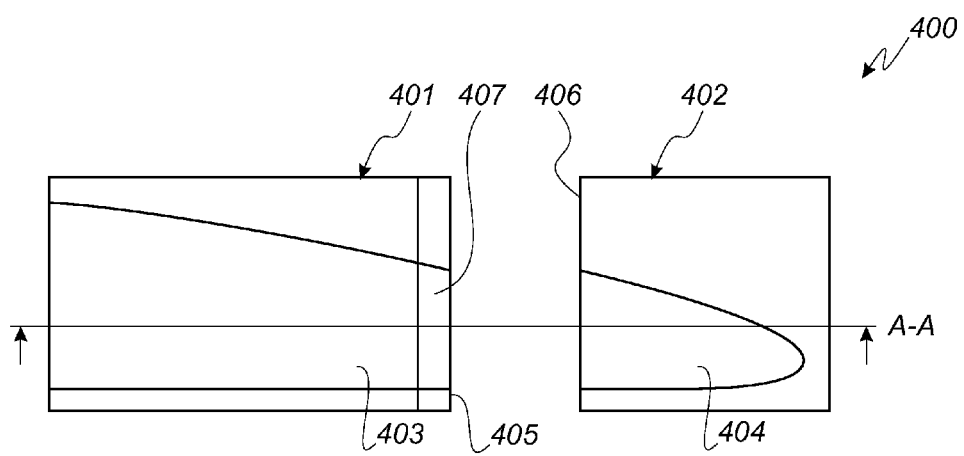
FIG. 4 shows a partial top view of an embodiment of the invention.

FIG. 4 illustrates part of a modular mould system according to the invention. The mould part 400 is assembled from the first mould section 401 and the second mould section 402 by joining the end sections 405, 406. To ensure a sufficient fit between the two end sections 405, 406, the flexible end segment 407 of the first mould section 401 is adjusted to substantially match the contour of the second moulding surface 404 at the second end section 406. Here, the first and second mould sections 401, 402 are illustrated to correspond to the airfoil region and blade tip 125 of a blade. However, the mould sections 401, 402 may correspond to any part of the blade.

Figure 5:
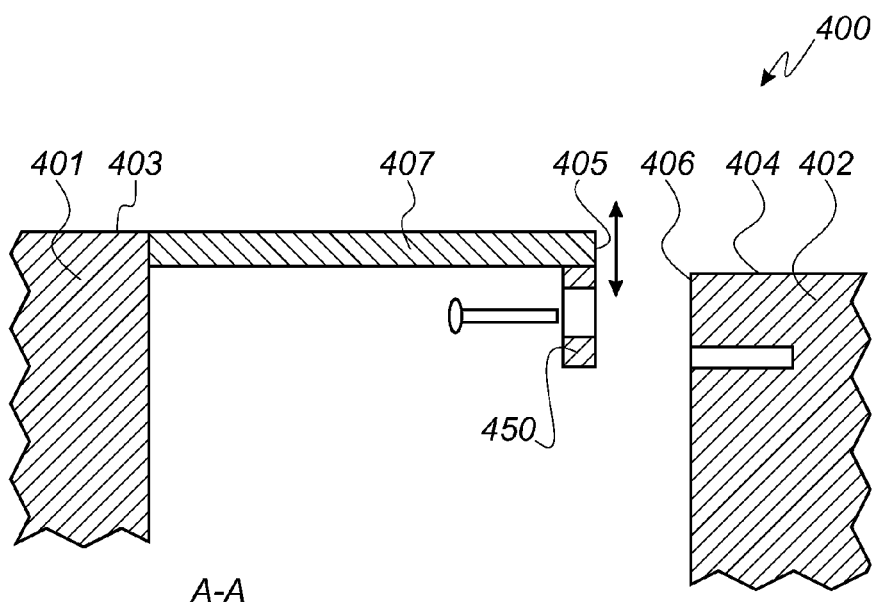
FIG. 5 shows a cross sectional view of an embodiment of the invention.

FIG. 5 illustrates a cross section along the line A-A in FIG. 4. The first mould section 401 is seen to comprise an end segment 407, which may e.g. be made as a composite plate. On assembly of the mould part 400, the flexible end segment 407 is adjusted as indicated by the arrow to ensure a smooth transition from the first mould section to the second mould section, so that the first and second moulding surfaces 403, 404 may act as a single continuous moulding surface. The two moulding sections 401, 402 may for instance be joined with a number of bolts, as shown in the figure. However, any other suitable means of attachment may also be used for this purpose.

Figure 6:
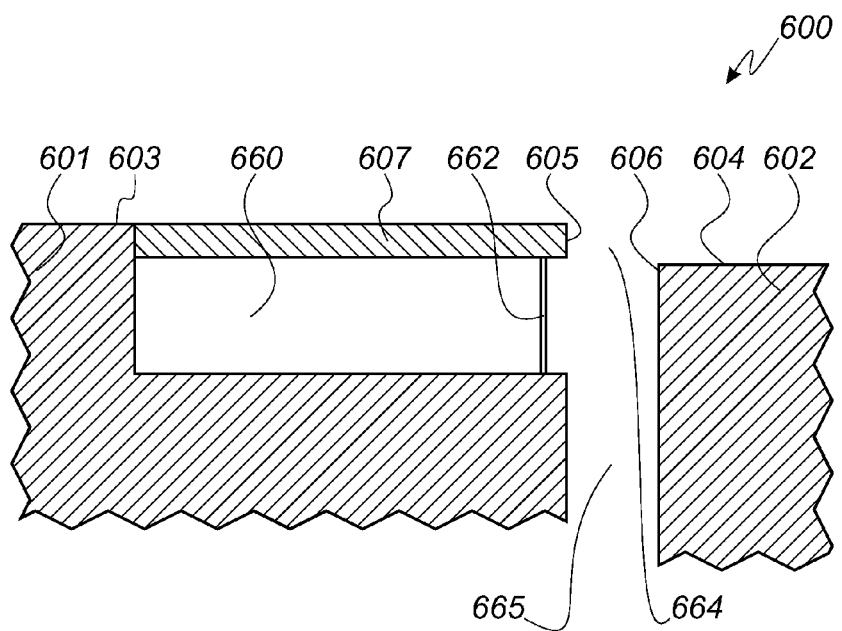
FIG. 6 shows a cross sectional view of another embodiment of the invention.

FIG. 6 illustrates a cross section of another embodiment of the invention, corresponding to that illustrated in FIG. 5 where like reference numerals refer to like parts. Therefore, only the differences between the two embodiments are discussed here. In this embodiment, the first mould section 601 comprises a cavity 660 in vicinity to the end segment 607. This cavity 660 may be filled with a fluid, which is preferably substantially non-compressible for stabilising the end segment 607 during moulding of the composite structure. For example, the fluid may be water. The cavity may e.g. be terminated towards the second mould section 602 by a sealing means 662, such as an impermeable membrane. Alternatively, the interface 664 between the end segment 607 and the second mould section 602 as well as the interface 665 between the two mould sections 601, 602 may be sealed to yield the cavity 660.

Figure 7:
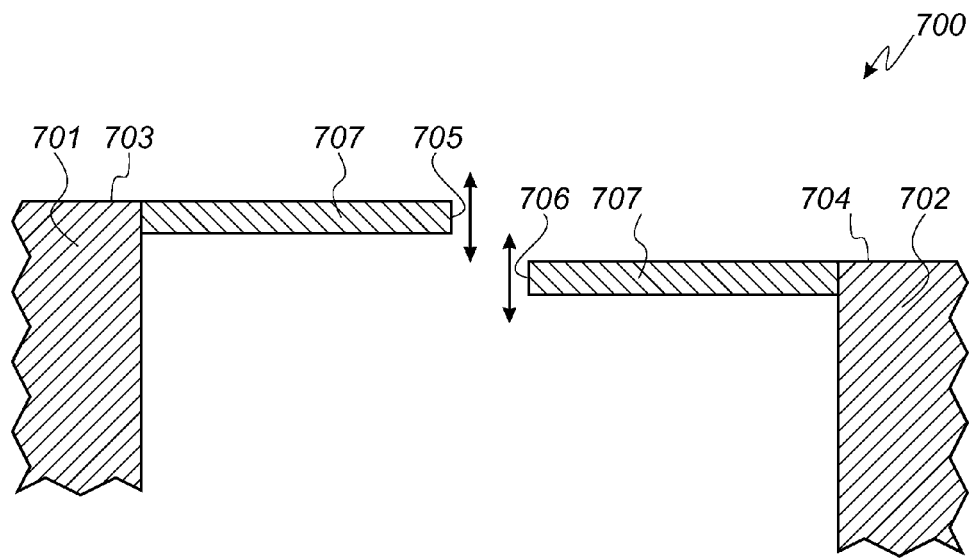
FIG. 7 shows a cross sectional view of another embodiment of the invention.

FIG. 7 illustrates a cross section of another embodiment of the invention, corresponding to that illustrated in FIG. 5 where like reference numerals refer to like parts. Therefore, only the differences between the two embodiments are discussed here. In this embodiment, the second mould section 702 also comprises a flexible end segment 770, in addition to the end segment 707 of the first mould section 701. Naturally, this embodiment may be combined with the one shown in FIG. 6, i.e. to comprise a cavity in vicinity to the first and second end segments 707, 770.

Figure 8A:
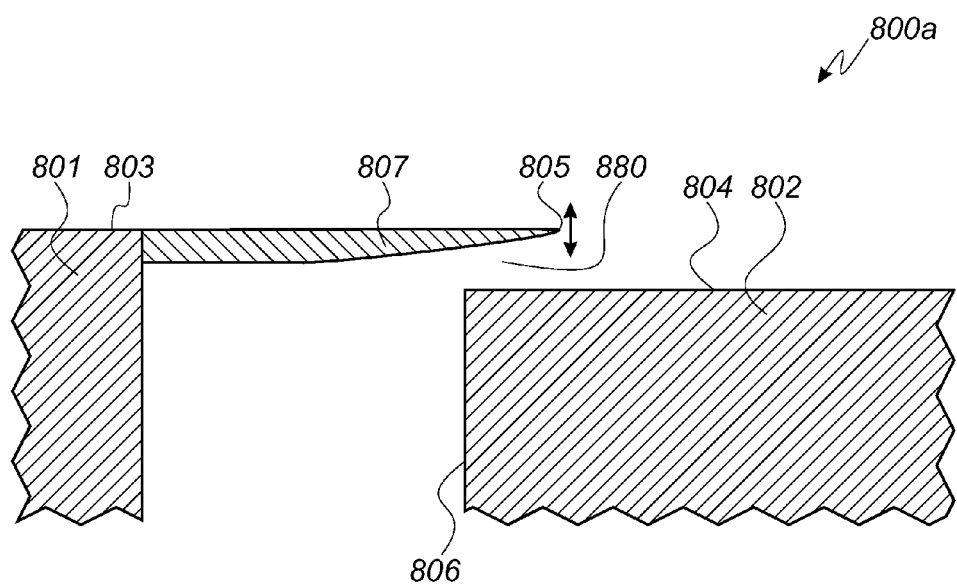
FIGS. 8a and 8b show cross sectional views of other embodiments of the invention.
Figure 8B:
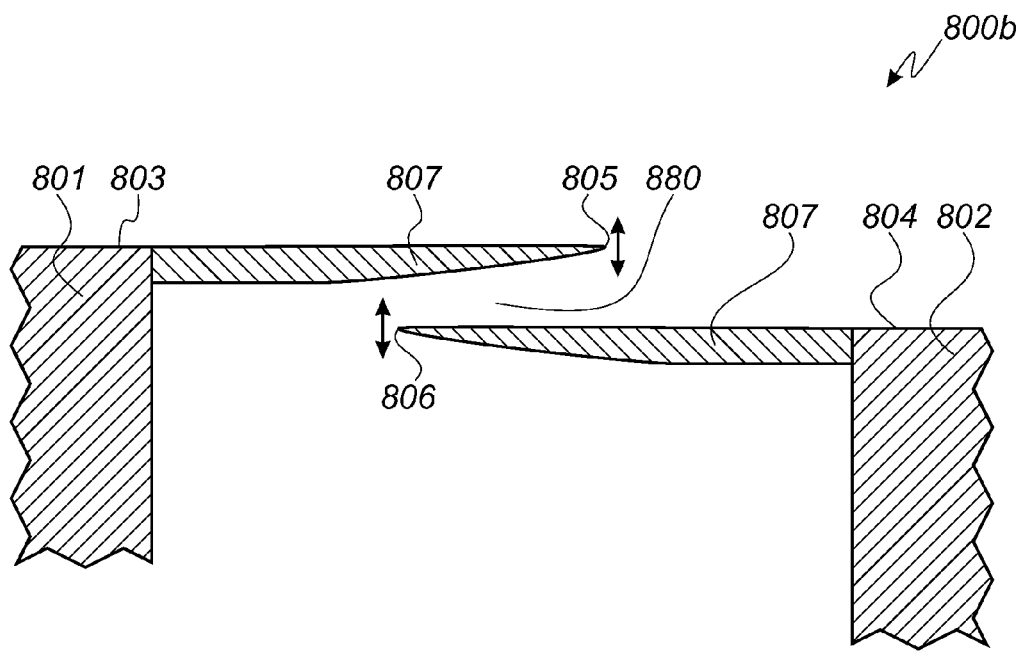

FIGS. 8a and 8b illustrate cross sections of other embodiments of the invention, corresponding to that illustrated in FIG. 5 where like reference numerals refer to like parts. Therefore, only the differences between the embodiments are discussed here. In the embodiment in FIG. 8a, the end segment 807 of the first mould section 801 is arranged to provide an overlap 880 with the end section 806 of the second mould section 802. Likewise, in FIG. 8b, the end segment 807 of the first mould section 801 is made to overlap the end segment 870 of the second mould section 802.

Figure 9:
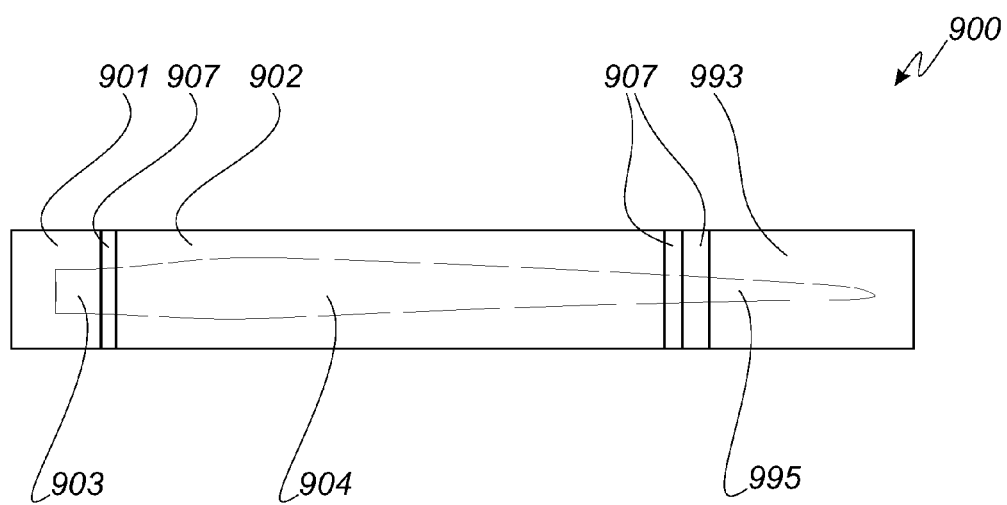
FIG. 9 shows a top view of another embodiment of the invention.

FIG. 9 illustrates an assembled mould part 900 according to an embodiment of the invention. Here, the mould part 900 is illustrated to comprise three mould sections, namely the first 901, second 902, and third 993 mould section, which comprise the first 903, second 904, and third 995 moulding surfaces, respectively. However, the mould part 900 may comprise any number of mould sections, such as two, three, four, five, six, or more, and a corresponding number of moulding surfaces. As illustrated here, the first moulding surface 903 is adapted to define the profile of part of the blade root section, the second moulding surface 904 is adapted to define the contour of part of the transition region and airfoil region of the blade, and the third moulding surface 995 is adapted to define the tip region of the blade. However, many arrangements of the mould sections may be envisioned without deviating from the scope of the invention. he connection between the first 901 and second mould section 902 is shown to include one end segment 907, while the connection between the second 902 and third 993 mould section is shown to include end segments 907 on both mould sections 902, 993. This serves to illustrate that both types of connections may be present in an assembled mould part 900. However, the mould part 900 may comprise only connections of one type.

Figure 10:
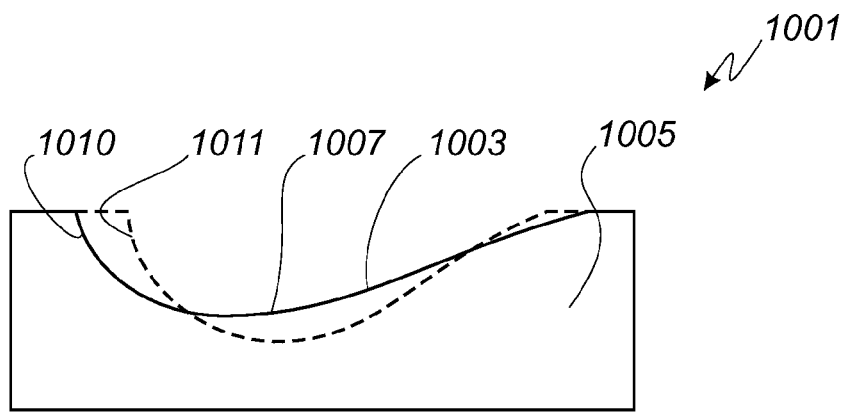
FIG. 10 shows an end view of another embodiment of the invention.

FIG. 10 illustrates an end view of a first mould section 1001, wherein the end segment 1007 is transformable between a first contour 1010 (solid lines) and a second contour 1011 (dashed lines). This may be achieved by forming the end segment 1007 as a plate with a sufficiently large flexibility.

Figure 11:
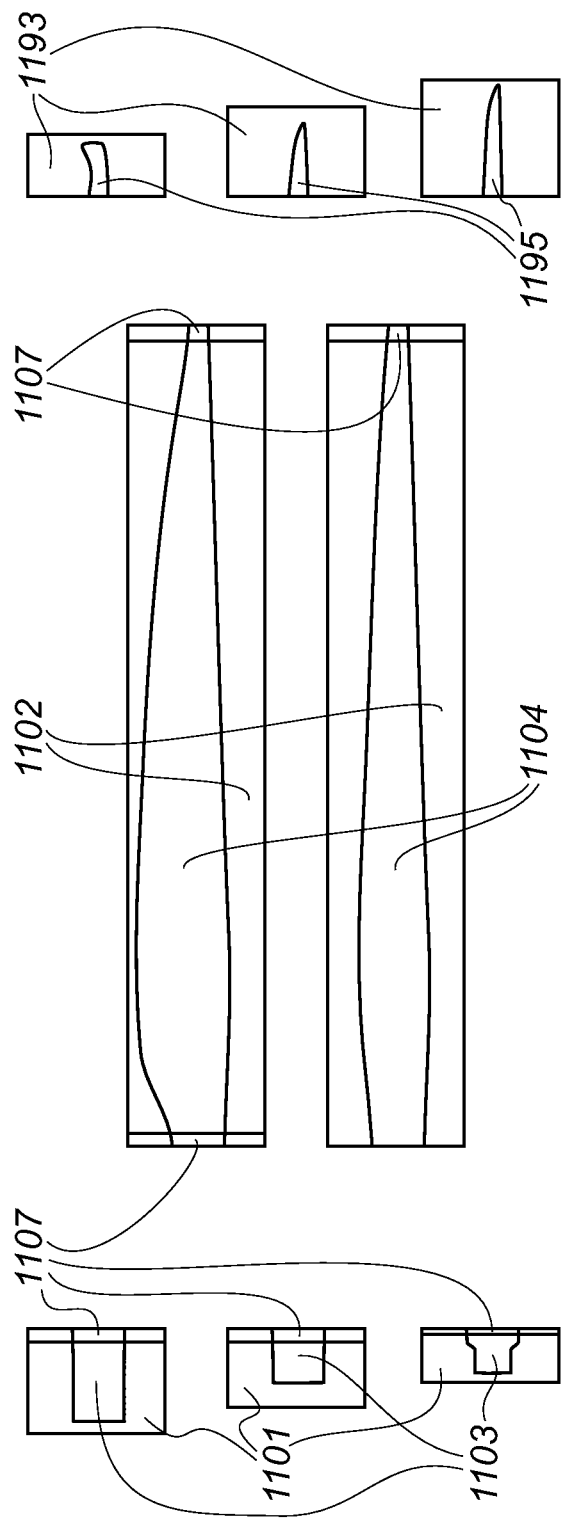
FIG. 11 shows a top view of another embodiment of the invention.

FIG. 11 illustrates a modular mould system 1100, which comprises a number of first mould sections 1101, a number of second mould sections 1102, and a number of third mould sections 1193. Naturally, the system may further comprise any number of additional mould sections. It is illustrated that e.g. the first mould sections 1101 are not required to have identical dimensions but rather may be made to fit the corresponding section of the object to be moulded.

The invention has been described with reference to preferred embodiments. However, the scope of the invention is not limited to the illustrated embodiments, and alterations and modifications may be carried out without deviating from the scope of the invention. For example, the invention has been described with reference to moulding of shell parts of wind turbine blades, while the system may be used for a wide variety of oblong composite structures, such as boat hulls, aircraft fuselages, etc.

REFERENCE NUMERALS 100, 400, 600, 700, 800a, 800b, 900, 1000, 1100 mould part
101, 401, 601, 701, 801, 901, 1001, 1101 first mould section
102, 402, 602, 702, 802, 902, 1102 second mould section
103, 403, 603, 703, 803, 903, 1003, 1103 first moulding surface
104, 404, 604, 704, 804, 904, 1104 second moulding surface
105, 405, 605, 705, 805, 905, 1005, 1105 end section (of first mould section)
106, 406, 606, 706, 806, 906, 1106 end section (of second mould section)
107, 407, 607, 707, 807, 907, 1007, 1107 end segment
120 wind turbine
121 tower
122 nacelle
123 hub
124 blade
125 blade tip
126 blade root
130 unitary mould part
131 moulding surface (of unitary mould)
450 mounting flange
660 cavity
662 sealing means
664, 665 interface
880 overlap
993 third mould section
995 third moulding surface
1010 first contour
1011 second contour

The invention claimed is:

1. A modular mould system for manufacturing a shell part of an oblong composite structure, the structure comprising a fibre reinforced matrix material and having a longitudinal direction, the mould system including a number of mould sections, which are adapted to being connected to an assembled mould part, the number of mould sections comprising at least:
   a first mould section for moulding a first longitudinal part of the shell part and having a first moulding surface with a contour that defines a surface of the first longitudinal part of the shell part, the first mould section comprising a first mould end section and
   a second mould section for moulding a second longitudinal part of the shell part and having a second moulding surface with a contour that defines a surface of the second longitudinal part of the shell part, the second mould section comprising a second mould end section, which when the modular mould system is connected to the assembled mould, abuts the first mould end section, characterised in that
   the first moulding surface comprises a first moulding surface end segment protruding outwards at the first mould end section, the first moulding surface end segment being flexible to substantially match the contour of the second moulding end section when the second moulding end section abuts the first moulding end section such that the first and second moulding surfaces form a single continuous moulding surface.

2. A modular mould system according to claim 1, wherein the oblong composite structure is a wind turbine (120) blade (124) having a root (126) region and a tip (125) region.

3. A modular mould system according to claim 1 wherein an end facet of the first moulding surface (103, 403, 603, 703, 803, 903, 1003, 1103) fits substantially to an end facet of the second moulding surface (104, 404, 604, 704, 804, 904, 1104).

4. A modular mould system according to claim 1, wherein the end segment (107, 407,607,707,807,907, 1007, 1107) of the first moulding surface (103, 403, 603, 703, 803, 903, 1003, 1103) is made as a flexible plate element.

5. A modular mould system according to claim 4, wherein the flexible plate element comprises a fibre reinforced matrix material.

6. A modular mould system according to claim 4,wherein the first mould section (101, 401, 601, 701, 801, 901, 1001, 1101) comprises a cavity (660) containing a fluid, preferably a substantially non-compressible fluid, for supporting the flexible plate element.

7. A modular mould system according to claim 1, wherein the second moulding surface (104, 404, 604, 704, 804, 904, 1104) comprises an end segment (107, 407, 607, 707, 807, 907, 1007, 1107) at the end part of the second mould section (102, 402, 602, 702, 802, 902, 1102), the end segment (107, 407, 607, 707, 807, 907, 1007, 1107) of the second moulding surface (104, 404,604, 704, 804, 904, 1104) being flexible.

8. A modular mould system according to claim 7, wherein the end segments (107, 407, 607, 707, 807, 907, 1007, 1107) of the first moulding surface (103, 403, 603, 703, 803, 903, 1003, 1103) and the second moulding surface (104, 404, 604, 704, 804, 904, 1104) abut each other.

9. A modular mould system according to claim 1, wherein the end segment (107, 407, 607, 707, 807, 907, 1007, 1107) of the first moulding surface (103, 403, 603, 703, 803, 903, 1003, 1103) overlaps the end section (106, 406, 606, 706, 806, 906, 1106) of the second moulding surface (104, 404, 604, 704, 804, 904, 1104) or overlaps the end segment (107, 407, 607, 707, 807, 907, 1007, 1107) of the second moulding surface (104, 404, 604, 704, 804, 904, 1104) when the modular mould system is assembled to the assembled mould.

10. A modular mould system according to claim 1, wherein the first mould section (101, 401, 601, 701, 801, 901, 1001, 1101) and/or the second mould section (102, 402, 602, 702, 802, 902, 1102) comprises an additional end part, wherein the first moulding surface (103, 403, 603, 703, 803, 903,1003, 1103) and/or the second moulding surface (104, 404, 604, 704, 804, 904, 1104) comprises an additional end segment (107, 407, 607, 707, 807, 907, 1007, 1107) at said additional end part, the additional end segment (107, 407, 607, 707, 807, 907, 1007, 1107) of the first moulding surface (103, 403, 603,703, 803, 903, 1003, 1103) and/or the second moulding surface (104, 404, 604, 704, 804, 904, 1104) being flexible.

11. A modular mould system according claim 1, wherein the end segment (107, 407,607,707,807,907, 1007, 1107) of the first moulding surface (1 03, 403, 603, 703, 803, 903, 1003, 1103) is transformable between a first contour (1010) and a second contour (1011).

12. A modular mould system according to claim 1, wherein at least the end segment (107, 407, 607, 707, 807, 907,1007, 1107) of the first mould section (101, 401, 601, 701, 801, 901, 1001, 1101)extends in at least 5% of the longitudinal direction of first mould section's (101, 401,601, 701, 801, 901, 1001, 1101) length.

13. A modular mould system according to claim 2, wherein the mould system comprises a plurality of separate mould sections for moulding root (126) regions with different contours.

14. A modular mould system according to claim 2, wherein the mould system comprises a plurality of separate mould sections for moulding tip (125) regions with different contours.

\* \* \* \* \*